Sept. 27, 1960　　A. D. ADLER ET AL　　2,953,860
ATOMIC UNITS FOR MOLECULAR MODELS
Filed May 25, 1959　　2 Sheets-Sheet 1
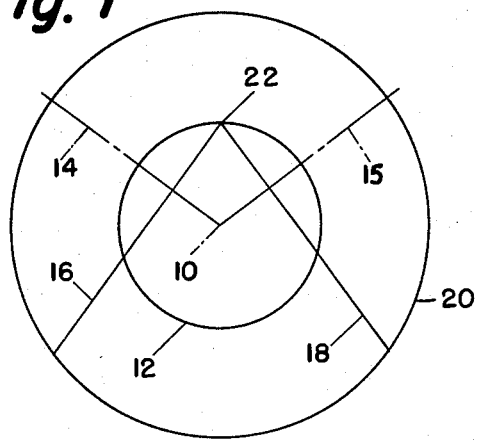
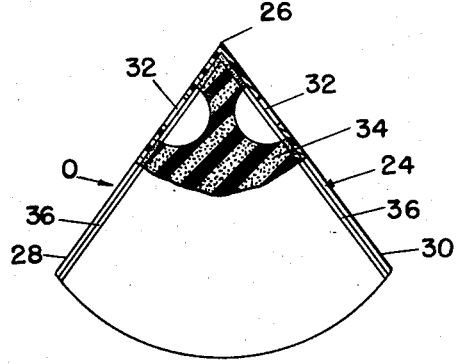
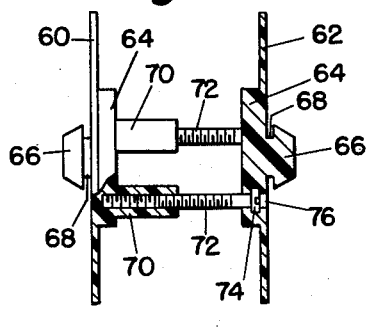
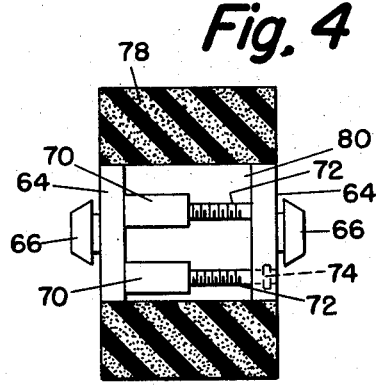
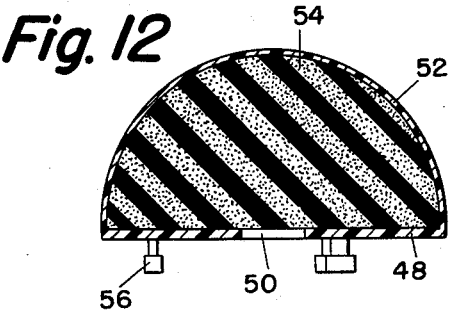
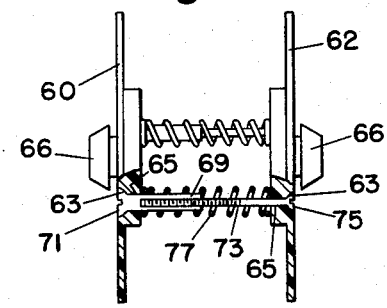
INVENTORS
ALAN D. ADLER
WILLIAM J. STEELE
BY Max R. Millman
ATTORNEY

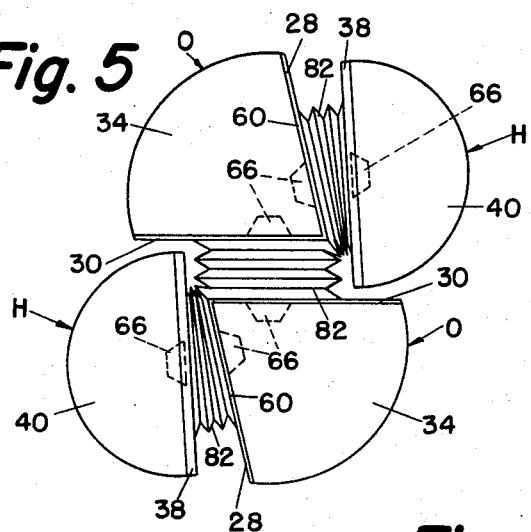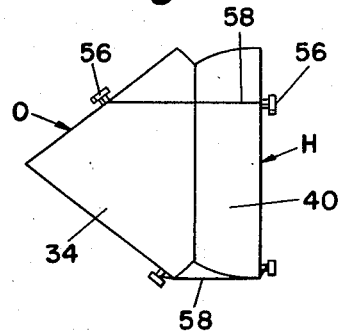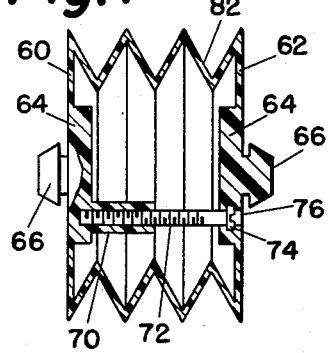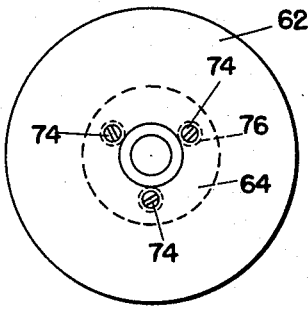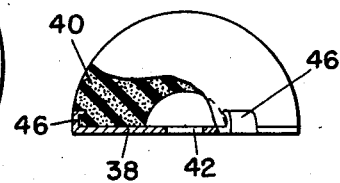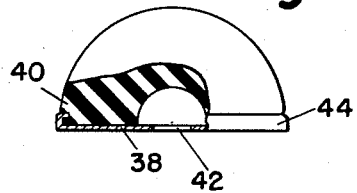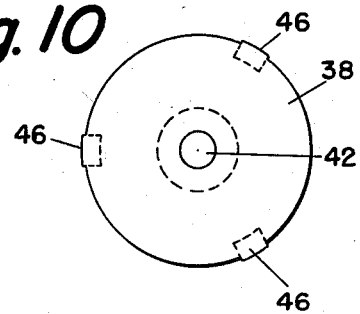

United States Patent Office 2,953,860
Patented Sept. 27, 1960

2,953,860

ATOMIC UNITS FOR MOLECULAR MODELS

Alan D. Adler, Philadelphia, Pa. (Trooper Road, R.D. 1, Norristown, Pa.), and William J. Steele, 1216 S. Wilton St., Philadelphia, Pa.

Filed May 25, 1959, Ser. No. 815,553

10 Claims. (Cl. 35—18)

This invention relates to atomic units for molecular models and is a continuation-in-part of our copending application Serial No. 779,578, filed December 11, 1958.

The primary object of the invention is to provide atomic units for molecular models which allow for continuous adjustment of bond angles and bond lengths and for deformability of van der Waal's radii. By virtue of this, the units are capable of representing the widest variety of compounds and are especially adapted for the accurate representation of geometrically hindered and/or resonant molecules which cannot always be accurately represented by existing atom models.

Another object of the invention is to provide durable, inexpensive, light-weight and easily manufactured solid atom models which correctly represent van der Waal's volume and are capable of showing point deformability.

Another object of the invention is to provide a link of special construction and design for use with atomic units in molecular models wherein bond lengths and bond angles may be continuously adjusted within the link itself.

Another object of the invention is to provide atomic units for molecular models wherein deformable units are combined with internally adjustable links, the assembly and adjustability being readily, easily and accurately effected with a minimum of manipulation.

These and other objects of the invention will become more apparent as the following description proceeds in conjunction with the accompanying drawings, wherein:

Figure 1 is a geometrical layout diagram illustrating a method of constructing a di-univalent oxygen atom model;

Figure 2 is an elevational view of the di-univalent oxygen atom model in three dimensions made as per Figure 1, parts being broken away and shown in section;

Figure 3 is a vertical sectional view through an adjustable link for connecting the atom models, parts being shown in elevation;

Figure 4 is a side elevational view of an adjustable link associated with a semi-space filling member;

Figure 5 is an elevational view of atomic units assembled to accurately represent gaseous hydrogen peroxide;

Figure 6 is an end elevational view of oxygen and hydrogen units illustrating the deformability of the hydrogen unit as, for example, in a "hydrogen bonded situation";

Figure 7 is a vertical sectional view through a modified form of link assembly incorporating a semi-space filling sleeve;

Figure 8 is an end elevational view of the link assembly of Figure 7;

Figure 9 is a modified form of atomic model or unit;

Figure 10 is a face view of the unit shown in Figure 9;

Figure 11 is another modified form of atomic unit;

Figure 12 is yet another modified form of atomic unit; and

Figure 13 is an end elevational view of a modified form of link assembly, parts being broken away and shown in section.

Specific reference is now made to the drawings wherein similar reference characters are used for corresponding elements throughout.

Before proceeding with a description of the drawings, a brief explanation of the important parameters and bonds will be useful. The types of bonds formed between chemical species and their relative stabilities are described by quantum mechanics. An individual atom consists of a dense positively charged nucleus surrounded diffusely by as many electrons as are required for charge neutrality. These electrons repel each other and hence are localized at a region in space though in dynamic motion.

An ionic bond is formed when electrons are gained or lost completely by an element. Because the ions formed are held together by the electrostatic attraction of opposite charges, the ionic bond is omnidirectional. A covalent bond is formed when each atom contributes an electron to the bond. In this process of sharing electrons, the nuclei are drawn closer together. The internuclear distance is termed the bond length. In contradistinction to ionic bonds, a covalent bond has strong directional characteristics. i.e., the atoms can only bond at certain angles to each other known as the bond angle. Multiple bonds may be formed along the same given bond direction by the sharing of two or three electrons for each atom. It is manifest, therefore, that covalently bonded atom models must show not only their bond order (single, double or triple) but also the proper bond angles and lengths.

A repulsive force exists between all atoms not involved in a chemical union or bond because electrons tend to repel each other. The distance of closest approach between non-bonded atoms is termed the van der Waal's radius. While the van der Waal's radius and the ionic radius are the same for ionic compounds, covalently bonded atoms must be closer to one another than their van der Waal's radii. It is therefore important that the region of space unavailable to other non-bonded atoms be properly delineated. The van der Waal's region will not be a simple sphere but will depend upon the bond order, bond length and bond angle of the atoms involved in the covalent bond. The van der Waal's radius is one of the most important structural features of covalent bonding.

Electron pair sharing may be accomplished by another process in which one atom forming the bond donates both of the electrons which are shared. This is termed a coordinate covalent bond. Such bonding is favored under conditions of high spatial symmetry. This type of bonding is space-filling and hence variations are primarily in the bond length.

There are other bonding situations which do not fall in the above categories, most notable of which is the "hydrogen bond," an electrostatic bond formed by the attraction of the non-bonded electrons of the smaller covalent electronegative atoms (oxygen, nitrogen and fluorine) and the hydrogen atom in covalent structures in which it tends to be electropositive. Hydrogen bonding leads to a decrease in van der Wall's radius of the covalent hydrogen atom, since it is now attracted closer to the electronegative center which itself must deform slightly.

Thus it is important that atomic units for molecular models, to have versatility, must provide for continuous adjustment of bond angles and bond length and for deformability of van der Waal's radii. Also, since in geometrically hindered and/or resonant molecules the bonds are often "mixtures" of the two basic bonds, covalent and ionic, the use of bond angles, bond lengths and van der Waal's radii collected on simple, strain-free molecules leads to considerable error in the structural representations, unless provision is made for precise adjustment of the three parameters.

The instant invention is directed to atomic units in which all three parameters can be continuously adjusted.

Before referring to the drawings, attention is called to the fact that data with reference to bond angles, bond length and van der Waal's radii can be obtained from the literature, such as L. Pauling, "The Nature of the Chemical Bond," Cornell University Press; Evans, "Crystal Chemistry," Cambridge University Press; Wells, "Structural Inorganic Chemistry" and "The Third Dimension in Chemistry," both published by Oxford University Press and other texts and scientific journals.

Referring now to the drawings which, for illustrative purposes only, relate to certain atoms, it will be understood that the planned scale of the units is arbitrary, but we prefer a scale of 2.00 cm. to 1.00 Angstrom unit. Figures 1 and 2 relate to the di-univalent oxygen atom model O which is constructed as follows. With point 10 as the center, a circle 12 is drawn having a radius of 1.32 cm. or twice the recorded covalent radius of 0.66 for di-univalent oxygen. Since the usual covalent angle between the bond directions is 105°, using a protractor centered at point 10 this angle is laid out producing two lines 14 and 15 representing bond directions. From the points where each of said lines intersect the circle 12 a distance of ½ cm. is measured along said lines towards the center point 10 and marked off and two additional lines 16 and 18 are drawn perpendicular to lines 14 and 16 passing through the marked-off distances. Again using the center point 10, a circle 20 is drawn with a van der Waal's radius of 2.8 cm., which is twice the recorded radius of 1.4 A. It will be seen that the circle 20 intersects the lines 16 and 18 and the latter intersect at the apex 22. The area encompassed between lines 16 and 18, the apex 22 and the smaller arc of the circle 20 represents the oxygen model.

Using a sheet of light-weight fibrous, metallic or plastic material and preferably the latter, the same 24 is cut, dimensioned and shaped to form an open three-dimensional object having a chordal apex 26, equivalent to apex 22, and a pair of planar bond walls 28 and 30 equivalent to lines 16 and 18 and spaced apart as determined from Figure 1. Holes 32 are provided in the walls 28 and 30 centrally located along the bond directions 14 and 16 to receive bonding links. A piece of resilient foam material 34, such as polyurethane, natural and synthetic sponge, foam rubber and equivalent materials, is cut or molded to fill the space between the walls 28 and 30, the foam piece 34 being a segment of the sphere defined by the circle 20 and the lines 16 and 18 of Figure 1. The foam piece 34 may be molded integrally with the member 24 between the walls 28 and 30 thereof or may be secured by an appropriate adhesive 36 to the entire inner faces of the walls.

It will be evident to skilled artisans that the aforementioned principles are readily applicable for the construction of all types of atom models which will vary in shape as modifications of spheres, the variations in shape depending, of course, upon the nature of the atom, its valency, its van der Waal's radius, its covalent radius and the angle between the bond directions. The hydrogen atom model H as illustrated herein would take the form of a portion of a sphere (approximating a semisphere) having a planar bond wall or face 38 of fibrous material, metal or plastic and preferably the latter, and an arcuate foam member 40 secured thereto, there being a hole 42 centrally in the wall 38 for the reception of a bonding link.

Several means for securing the foam piece to the planar bond walls may be employed other than the integral molding and adhesion methods mentioned hereinabove. For example, a number of mechanical means may be used, such as providing the bond wall 38, as shown in Figure 11, with a peripheral force fit rim 44 to grip and hold the foam piece 40 in position against the wall. As shown in Figures 9 and 10, the bond wall 38 may be provided with spaced hook-type grips 46 to engage the foam piece 40. Also, the foam piece may be magnetically attached to the bond wall or plate by embedding in the latter randomly oriented magnetized ferromagnetic material and by embedding ferro-magnetic material in the foam piece. If desired, the foam piece 34 may be coated with a thin plastic film providing a smooth deformable surface.

A variant of the atomic units is shown in Figure 12, the hydrogen atom being chosen for illustrative purposes only. The model is molded of a suitable plastic to form a planar bond wall 48 having a central link receiving aperture 50 and a thinner spherical deformable portion or skin 52. The interior of the model is filled with a foam material 54 which can readily be accomplished by placing a polyurethane-producing reaction mixture into the model and allowing the formed foam to fill up the cavity.

T-shaped or equivalent buttons 56 are fixedly or removably secured to the bond walls at desired positions preferably near the peripheral free edges thereof for a purpose soon to appear.

Figure 6 illustrates the deformability of the units to represent the distortion of van der Waal's radii. Because of the foam pieces in the atomic units, point deformability can be represented which is a more accurate depiction of the type of distortion of van der Waal's radii actually encountered in nature. When hydrogen is adjacent a highly electronegative element such as oxygen, an electrostatic bond is formed in which the nuclei are drawn together thereby distorting the van der Waal's radii. A sound and effective way of depicting this is shown in Figure 6. Note that the foam members 34 and 40 of the O and H atom model units press into each other and are retained in this position in which the nuclei are closer together, by means of flexible bands or springs 58 hooked over the buttons 56 of the H and O atom model units respectively. It is to be understood that different foam textures permit demonstration of different van der Waal's radii deformability of different atoms, as for example in $H_2O$.

Coming now to the adjustable link, which may be made of metal or plastic, the basic unit is shown in Figure 3 and comprises a pair of circular plates 60 and 62, each including a thickened central portion 64 and a central tapered linking stud 66 which is connected to the plate via a reduced shank portion 68. The thickened portion 64 of one plate 60 includes three laterally extending, circumferentially spaced internally threaded bosses 70 which receive the free ends of screws 72 that are threaded along their length. The other ends of the screws have heads 74 which extend into and are retained by the thickened portion 64 of the other plate 62, there being an opening 76 in the plate at each screw head to allow access of a screw driver. It is to be understood that the plates 60 and 62 and threaded members 70, 72 must be flexible relative to each other.

The adjustable link can readily be associated with or include in its structure a semi-space filling unit. As shown in Figure 4, the opposed plates 60 and 62, preferably reduced in size to the dimensions of the thickened portions 64, serve to support a foam rubber washer 78 having a central aperture 80. To facilitate mounting of the washer 78 on and removal of the same from the link assembly, the washer may be provided with a tapered slit (not shown) extending from its outer edge to its central aperture. In the form of link assembly shown in Figure 7, the semi-space filling unit is a cylindrical flexible sleeve 82 preferably but not necessarily of the bellows type which is either integral with or simply mounted upon the peripheries of the opposed plates 60 and 62.

In the form of link assembly shown in Figure 13 each of the plates 60 and 62 is provided with recessed sockets 63 spaced 120° apart about the studs 66. Each socket communicates with a through bore 65. An elongated internally threaded member 69 extends through the bore 65 and includes a slotted head 71 at one of its ends, the latter being received in and mating with the concave socket 63. An elongated threaded member 73 extends through the bore 65 of the other plate 62 and is received in the member 69, said member 73 including a slotted head 75 which is received in and mates with the concave socket 63 of the plate 62. A spring 77 is wound about the members 69 and 73 and normally urges the plates 60 and 62 apart.

The use of the adjustable links and foam plastic distortable atom models as described above for the accurate representation of a molecule is shown in Figure 5, gaseous hydrogen peroxide having been chosen for illustrative purposes. From the literature one learns that the molecule assumes a position in which the hydrogen atoms are in planes at a dihedral angle to each other of 94°, the oxygen atoms being located at the intersection of said planes. The H—O bond length is taken as 0.96 A (based on the sum of the covalent radii), the O—O bond length is given as 1.46 A and the O—O—H bond angle as 101° 30′ (based on observed physical data).

The hydrogen and oxygen models are attached to each other by the link assembly units. The tapered stud 66 of each plate 60 is pushed into the O model through the apertures 32 until the plates 60 abut the bond walls 28 of the O models. The opposite stud 66 of each plate 62 is then pressed through the hole 42 of the H model until the plates 62 abut the bond walls 38 of the H models, the link assembly having been previously adjusted to the desired bond length (0.96 A=1.92 cm.) and bond angle (101.5°). The dimensions permit free rotation of the models about the studs 66 after engagement. As for the O—O bond length, the link connecting them can also be adjusted for the desired value (1.46 A=1.92 cm.) previous to its being engaged in the models as described above. It is manifest that continuous adjustment can be made over the entire lengths of the screws and bosses.

The models are so designed that 0.25 A of each of their covalent radii are assigned to the link assembly. Therefore, in simple strain-free molecules where the sum of the covalent radii does give the observed interatomic distance or bond length, one requires a 1.00 cm. link assembly between the planar or bond faces of the models to give this distance. If the observed bond length differs from the sum of the covalent radii, this must be adjusted for in the link assembly accordingly. This is the case in gaseous $H_2O_2$ where the observed O—O bond length is 1.46 A or 2.92 cm. The sum of the O—O covalent radii is 2×0.66 A=1.32 A=2.64 cm., requiring that the link length between the planar faces 30 of the O atoms be increased from 1.00 cm. to 1.28 cm. giving a 1.46 A separation between the nuclei of the O atoms, the desired interatomic distance. This is accomplished by adjusting the three screws 72 via the heads 74 until the distance between the opposite outside faces of the plates 60 and 62 measure 1.28 cm. at each screw position and then the link assembly is engaged between the O units in the manner described above.

The literature states that the usual bond angle for oxygen-di-univalent, i.e., the bond angle most frequently encountered in a host of compounds, is 105°. Thus, the O model herein constructed has a bond angle of 105°. Therefore, when the O and H atoms are attached to each other by the adjustable link assemblies to form gaseous $H_2O_2$, it will be seen that the bond angles will be 105° instead of 101.5° unless this adjustment of angle is made in the link assemblies while maintaining the desired interatomic O—H distance of 0.96 A=1.92 cm. which requires that the opposite outside faces of the plates 60 and 62 be 1.00 cm. apart at the center of the plate face at the stud throat.

With the choice of 1.00 cm. for the radial distance along the plate face from the center thereof to the centers of each set of the three threaded members 70, 72, which are arranged in an equilateral triangle about the center, one can calculate the screw lengths needed for any given angular and/or length adjustment. Mathematically one can show, that with this choice of dimensions and two screws adjusted equally and the third independently, that half the sum of the two screw lengths is equal to the distance between the centers of the plate faces (i.e., along the required bond axis) and that a fourth of the difference of the two screw lengths is equal to the sine of half the desired angular adjustment. Therefore two independent screw adjustments may be calculated from two independent simultaneous equations to give any two independent changes in bond length and/or bond angle. Therefore with two screws adjusted until the distance between the outside faces of the plates at these screw positions is 1.06 cm. and 0.94 cm. at the third screw we have the desired total link center length of 1.00 cm. giving the required bond length and the required bond angle adjustment of 3.5°. The links thus adjusted are then engaged with the proper orientation into the O atoms and then further attached to the H atoms thus completing the assembly of the molecule with the proper dimensions. The semi-space filling washers 78 are then assembled on the plates 60 and 62. Rotation of the H models can also be effected to attain the dihedral angle of 92°.

While a preferred embodiment of the invention has been shown and described herein, it will be understood that minor variations may be made by skilled artisans without departing from the spirit of the invention and the scope of the appended claims. Thus, different colors can be chosen to represent the different atom models. The washers may be tinted with three intensities of the same color to represent single, double and triple bonds. Ionic atom models and elemental atom models can be depicted by simple hollow spheres. The present atom models can be modified to receive binding pins to restrain free rotation as is required, for example, in multiple bonding situations. Coordinate covalent models may also be designed in the same fashion as the covalent models. Also data identifying the atom represented and its physical parameters and constants may be imprinted upon the plates making up the models. Skilled artisans may also enlarge the scale of the units relative to the link assemblies thereby more closely approximating a completely space-filling unit, thus obviating the use of the semi-space filling washers.

We claim:

1. An atomic unit for molecular models comprising at least one planar bond wall and a resiliently deformable porous member secured thereto, said wall and deformable member together being a portion of a sphere constructed in proportion to the known van der Waal's and covalent radii and valency for the atom represented, both said van der Waal's and said covalent radii being on the same scale said wall being provided with means to removably receive a bonding link.

2. A pair of atomic units for molecular models, each unit comprising at least one planar bond wall and a resiliently deformable porous member secured thereto, said wall and deformable member together being a portion of a sphere constructed in proportion to the known van der Waal's and covalent radii and valency for the atom represented, both said van der Waal's and said covalent radii being on the same scale and a link assembly removably joining said units at their bond walls, said link assembly including means to continuously and adjustably fix the bond length or distance between said atomic units and to continuously and adjustably fix the bond angle or angular relation of said linked bond walls to each other.

3. A pair of atomic units for molecular models, each unit comprising at least one planar bond wall and a resiliently deformable porous member secured thereto, said wall and deformable member together being a portion of a sphere constructed in proportion to the known van der Waal's and covalent radii and valency for the atom represented, and a link assembly removably joining said units at their bond walls, said link assembly including means to adjustably fix the bond length or distance between said atomic units and to adjustably fix the bond angle or angular relation of said linked bond walls to each other, said link assembly comprising a pair of spaced plates having means thereon removably attaching the same to said bond walls and said means to adjustably fix the bond length and bond angle includes elongated members joining said plates, whereby the distance between said plates may be varied and fixed along the length of each of said elongated members, said elongated members and said plates being flexible relative to one another.

4. The combination of claim 3 wherein said elongated members are screws rotatably mounted on one of said plates and axially movable in internally threaded members carried by the other of said plates.

5. A pair of atomic units for molecular models, each unit comprising at least one planar bond wall and a resiliently deformable porous member secured thereto, said wall and deformable member together being a portion of a sphere constructed in proportion to the known van der Waal's and covalent radii and valency for the atom represented, both said van der Waal's and said covalent radii being on the same scale and a link assembly removably joining said units at their bond walls, said link assembly including means to continuously and adjustably fix the bond length or distance between said atomic units.

6. A link assembly for bonding atomic units whereby the bond angles and bond lengths are simultaneously adjustably fixed comprising a pair of spaced plates, means carried by each plate to removably attach the same to the bond wall of an atomic unit and elongated members joining said plates whereby the distance between said plates may be varied and fixed along the length of each of said elongated members, said elongated members and plates being flexible relative to one another.

7. A link assembly for bonding atomic units whereby the bond angles and bond lengths are simultaneously adjustably fixed comprising a pair of spaced plates, means carried by each plate to removably attach the same to the bond wall of an atomic unit and externally threaded elongated members joining said plates whereby upon rotation of each elongated member the distance between said plates along the length thereof may be varied and fixed, said elongated members and plates being flexible relative to one another.

8. The combination of claim 6 wherein said means to removably attach each of said plates to the bond wall of an atomic unit includes a tapered stud carried by said plate and adapted to extend through an aperture provided in the bond wall.

9. The combination of claim 6 and a semi-space filling member mounted upon the peripheries of said plates.

10. The combination of claim 6 wherein said semi-space filling member is an extensible and contractable sleeve integral with said plates.

References Cited in the file of this patent

UNITED STATES PATENTS

| | | |
|---|---|---|
| 2,308,402 | Taylor | Jan. 12, 1943 |
| 2,882,617 | Godfrey | Apr. 21, 1959 |

FOREIGN PATENTS

| | | |
|---|---|---|
| 1,101,229 | France | Apr. 20, 1955 |
| 690,938 | Great Britain | Apr. 29, 1953 |

OTHER REFERENCES

Review of Scientific Instruments (periodical), vol. 24, No. 8, August 1953, pages 621–625; article by Pauling et al. on Molecular Models.